(12) United States Patent
Wang

(10) Patent No.: US 10,302,879 B2
(45) Date of Patent: May 28, 2019

(54) OPTICAL COMMUNICATION MODULE

(71) Applicant: InnoLight Technology (Suzhou) LTD., Suzhou, Jiangsu (CN)

(72) Inventor: Kewu Wang, Jiangsu (CN)

(73) Assignee: InnoLight Technology (Suzhou) Ltd., Suzhou (CN)

( * ) Notice: Subject to any disclaimer, the term of this patent is extended or adjusted under 35 U.S.C. 154(b) by 0 days.

(21) Appl. No.: 15/701,967

(22) Filed: Sep. 12, 2017

(65) Prior Publication Data
US 2018/0074273 A1 Mar. 15, 2018

(30) Foreign Application Priority Data
Sep. 14, 2016 (CN) .......................... 2016 1 0825138

(51) Int. Cl.
| | |
|---|---|
| *G02B 6/42* | (2006.01) |
| *G02B 6/38* | (2006.01) |
| *H04B 10/50* | (2013.01) |
| *G08B 5/38* | (2006.01) |
| *H01R 13/717* | (2006.01) |
| *H01R 13/66* | (2006.01) |
| *H01R 13/633* | (2006.01) |

(52) U.S. Cl.
CPC ............ *G02B 6/4261* (2013.01); *G02B 6/385* (2013.01); *G02B 6/3895* (2013.01); *G02B 6/3897* (2013.01); *G02B 6/4203* (2013.01); *G02B 6/428* (2013.01); *G02B 6/4292* (2013.01); *G08B 5/38* (2013.01); *H01R 13/6658* (2013.01); *H01R 13/7172* (2013.01); *H04B 10/504* (2013.01); *H04B 10/506* (2013.01); *G02B 6/4284* (2013.01); *H01R 13/6335* (2013.01)

(58) Field of Classification Search
CPC ............................ H04B 10/504; H04B 10/506
See application file for complete search history.

(56) References Cited

U.S. PATENT DOCUMENTS

| | | | |
|---|---|---|---|
| 6,113,422 A | 9/2000 | Somerville et al. | |
| 8,135,282 B2 * | 3/2012 | Hosking | ................ H04B 10/40 398/135 |
| 8,861,972 B2 | 10/2014 | Hosking | |
| 9,230,416 B2 | 1/2016 | Ward et al. | |
| 2005/0254257 A1 | 11/2005 | Long | |
| 2005/0255726 A1 | 11/2005 | Long | |
| 2006/0228090 A1 | 10/2006 | Aldereguia et al. | |

(Continued)

FOREIGN PATENT DOCUMENTS

| | | |
|---|---|---|
| CN | 103091796 A | 5/2013 |
| CN | 203350491 U | 12/2013 |

(Continued)

*Primary Examiner* — Dzung D Tran
(74) *Attorney, Agent, or Firm* — Finnegan, Henderson, Farabow, Garrett & Dunner, LLP

(57) ABSTRACT

An optical communication module includes: a casing with an optical signal port and an electrical signal port arranged respectively on two ends of the casing; a circuit board assembly and an optical component assembly arranged inside the casing, the circuit board assembly including a circuit board and a control unit arranged on the circuit board; a fiber-optic communication cable connected to the optical signal port; and a status indicator unit arranged on the fiber-optic communication cable.

10 Claims, 4 Drawing Sheets

(56) References Cited

U.S. PATENT DOCUMENTS

| | | | |
|---|---|---|---|
| 2007/0270031 A1 | 11/2007 | Long | |
| 2010/0054749 A1* | 3/2010 | Hosking | H04B 10/40 |
| | | | 398/135 |
| 2014/0035755 A1* | 2/2014 | Ward | G08B 5/00 |
| | | | 340/691.1 |
| 2014/0156879 A1* | 6/2014 | Wong | G06F 11/3027 |
| | | | 710/19 |
| 2016/0054527 A1 | 2/2016 | Tang et al. | |
| 2016/0093175 A1 | 3/2016 | Ward et al. | |

FOREIGN PATENT DOCUMENTS

| | | |
|---|---|---|
| CN | 104503037 A | 4/2015 |
| CN | 104704409 A | 6/2015 |
| CN | 103064155 B | 7/2015 |
| CN | 105093391 A | 11/2015 |

\* cited by examiner

OPTICAL COMMUNICATION MODULE

CROSS-REFERENCE TO RELATED APPLICATIONS

This application is based upon and claims the benefit of priority from prior Chinese Patent Application No. 201610825138.4 filed on Sep. 14, 2016, the entire contents of which are incorporated herein by reference.

FIELD OF THE DISCLOSURE

The present invention belongs to the field of optical communication and, more particularly, relates to an optical communication module.

BACKGROUND

In the era of big data, data centers are playing an indispensable role. A data center is comprised of thousands of host devices, such as host computers, switching hubs, and network routers. In order to transmit data, a large number of optical communication modules are connected to these host devices, some of which may also accommodate multiple optical communication modules at a time. Most optical communication modules are pluggably connected to host devices by means of a port, which makes it easier to plug or remove the optical communication module. Each optical communication module typically communicates with its corresponding printed circuit board (PCB) of a host device by sending and receiving electronic data signals by means of an electrical communication interface.

Thousands of cables are used in a data center. For example, communication cables are used to connect host devices to one another. A communication cable contains an optical communication module at one or both ends, and the optical communication module at one or both ends of the communication cable is pluggably connected to the port of a host device. In this way, a host device has a very high number of optical communication modules. When an optical communication module experiences a connection failure with its host, or in the event of data transmission failure between the optical communication module and the host, etc., one or several of the optical communication modules will need to be replaced or inspected. Typically, a status indication is sent from the host, and the host first identifies the corresponding optical communication module, after which an operator identifies the corresponding optical communication module on-site and takes the required action. This method may be burdensome and time consuming.

SUMMARY

In order to address the above-mentioned issues, according to one embodiment of the present disclosure, an optical communication module is provided. The optical communication module includes: a casing with an optical signal port and an electrical signal port arranged respectively on two ends of the casing; a circuit board assembly and an optical component assembly arranged inside the casing, the circuit board assembly including a circuit board and a control unit arranged on the circuit board; a fiber-optic communication cable connected to the optical signal port; and a status indicator unit arranged on the fiber-optic communication cable, the control unit controlling the status indicator unit to provide status indication.

The optical communication module disclosed herein indicates the status of the optical communication module by means of the status indicator unit arranged on the fiber-optic communication cable. When the optical communication module needs to be replaced or inspected, the control unit can control the status indicator unit to provide status indication, allowing operation and maintenance personnel to quickly and visually identify optical communication modules in need of replacement or inspection so that they may take timely action.

DETAILED DESCRIPTION

Figure 1:
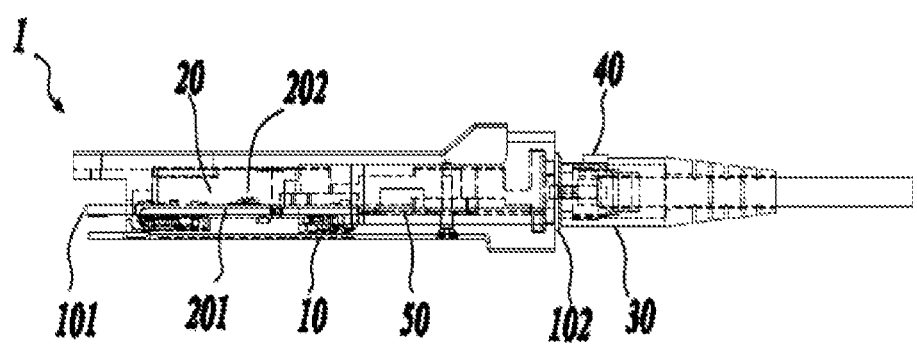
FIG. 1 is a sectional view of an optical communication module according to a first embodiment of the present disclosure.

Reference will now be made in detail to the present embodiments, examples of which are illustrated in the accompanying drawings. Wherever possible, the same reference numbers will be used throughout the drawings to refer to the same or like parts.

The text below provides descriptions of embodiments of the present disclosure as shown in the drawings. However, the embodiments do not limit the disclosure; the scope of protection for the present invention covers changes made to the structure, method, or function by persons of ordinary skill in the art based on the embodiments.

Figure 2:
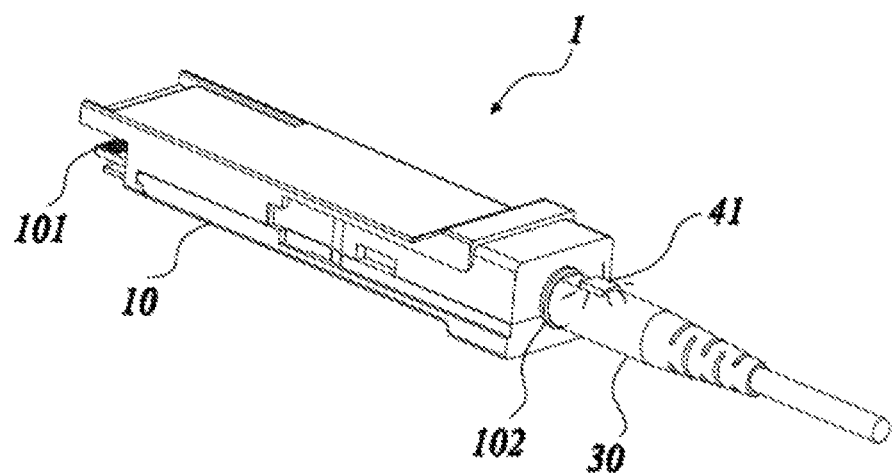
FIG. 2 is a perspective view of the entire optical communication module according to the first embodiment of the present disclosure.

FIGS. 1 and 2 illustrate an optical communication module 1 according to a first embodiment. As shown in FIGS. 1 and 2, the optical communication module 1 includes a casing 10, a circuit board assembly 20, an optical component assembly (not shown), a fiber-optic communication cable 30, and a status indicator unit 40 arranged thereon. An optical signal port 102 and an electrical signal port 101 are arranged respectively on the two ends of the casing 10, and the fiber-optic communication cable 30 is connected to the optical signal port 102. Once the fiber-optic communication cable 30 is assembled onto the optical signal port 102, optical signals can be exchanged between the optical component assembly within the optical communication module 1 and the fiber-optic communication cable 30. The circuit board assembly 20 includes a circuit board 201, a control unit 202 arranged on the circuit board 201, and other electronic elements arranged on the circuit board 201. In addition to being able to control the normal operations of the optical communication module 1, the control unit 202 can also control the status indicator unit 40 to provide status indication. The status indication includes failure indication, good operation indication, poor contact indication, etc. associated with the optical communication module 1. The status indicator unit 40 is arranged on an exposed surface of the fiber-optic communication cable 30 outside the optical signal port 102. This allows the status indicator unit 40 to be readily visible to operation and maintenance personnel.

In addition, the optical communication module 1 can be an SFP (Small Form-factor Pluggable) optical module, an SFF (Small Form Factor) optical module, or an optical module with an AOC (Active Optical Cable). In other words, the present application does not limit whether the fiber-optic communication cable is made to be fixed with the optical module at the beginning stage or pluggably connected to the optical module at a later stage.

In the embodiment, the status indicator unit 40 is electrically connected to the circuit board assembly 20 by means of a lead wire 50, and the lead wire 50 is secured to the fiber-optic communication cable 30. An outer casing of the fiber-optic communication cable 30 is typically formed of a plastic material, and a fiber-optic cable is encapsulated within the plastic outer casing. An accommodating groove can be set up on the outer casing of the fiber-optic communication cable 30 to secure the lead wire 50. Alternatively, the lead wire 50 can be formed on the outer casing of the fiber-optic communication cable 30 as an integrated part.

One end of the lead wire 50 is connected to the control unit 202 of the circuit board assembly 20, and the other end is connected to the status indicator unit 40. The status indicator unit 40 can provide status indication. Alternatively, the status indicator unit 40 can be a warning device or other element. The status indicator unit 40 in the first embodiment of the present disclosure is a status indicator light 41, and the status indicator unit 40 is embedded within a protective layer of the fiber-optic communication cable 30. Further, the status indicator light 41 can be an LED light source or an OLED light source.

Compared to the method of arranging the status indicator unit 40 on the casing 10 of the optical communication module 1, arranging the status indicator unit 40 within the protective layer of the fiber-optic communication cable 30 provides more space for securing the status indicator unit 40 and makes it easier to secure the status indicator unit 40. Furthermore, the status indicator unit 40 arranged on the fiber-optic communication cable 30 is not easily blocked by other elements, thereby making it easier for operation and maintenance personnel to identify at a glance the optical communication modules that need to be inspected or replaced.

The electrical connection between the control unit 202 and the status indicator unit 40 can also be established by other means. For instance, in another embodiment, an electrical contact point is arranged on each one of the fiber-optic communication cable 30 and the optical signal port 102. The electrical contact point on the fiber-optic communication cable 30 is electrically connected to the status indicator unit 40, and the electrical contact point on the optical signal port 102 is electrically connected to the circuit board assembly 20. The electrical connections between the electrical contact point on the fiber-optic communication cable 30 and the status indicator unit 40 and between the electrical contact point on the optical signal port 102 and the circuit board assembly 20 can be established by means of a lead wire. Once the fiber-optic communication cable 30 is connected to the optical signal port 102, an electrical connection will be established as the electrical contact point on the fiber-optic communication cable 30 comes into contact with the electrical contact point on the optical signal port 102. In this way, an electrical connection is established between the circuit board assembly 20 and the status indicator unit 40, and the control unit 202 is able to control the status indicator unit 40.

Figure 3:
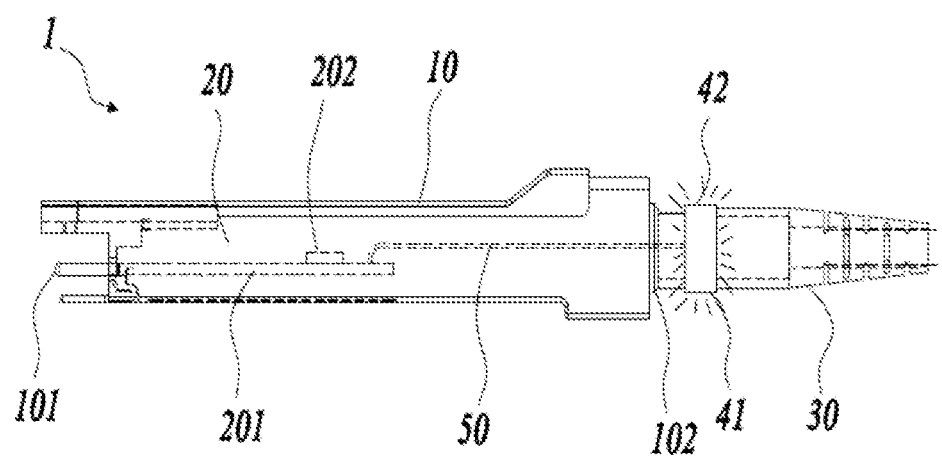
FIG. 3 is a sectional view of an optical communication module according to a second embodiment of the present disclosure.

FIG. 3 illustrates the optical communication module 1 according to a second embodiment. According to the second embodiment, the optical communication module 1 includes a light transmitting strip 42 arranged on an outer cover of the status indicator light 41, and the light transmitting strip 42 encircles the fiber-optic communication cable 30. When the control unit 202 sends a control signal to the status indicator light 41, the light generated by the status indicator light 41 can travel within the light transmitting strip 42 and illuminate at least one part of an external surface of the light transmitting strip 42, thereby providing status indication.

Further, the status indicator unit 40 can also be configured as a full-circle illuminating light or light strip that encircles the fiber-optic communication cable 30. When the control unit 202 sends a control signal to the full-circle illuminating light or light strip, the full-circle illuminating light or light strip can emit light based on a frequency setting of the control unit 202 and thereby provide status indication.

Figure 4:
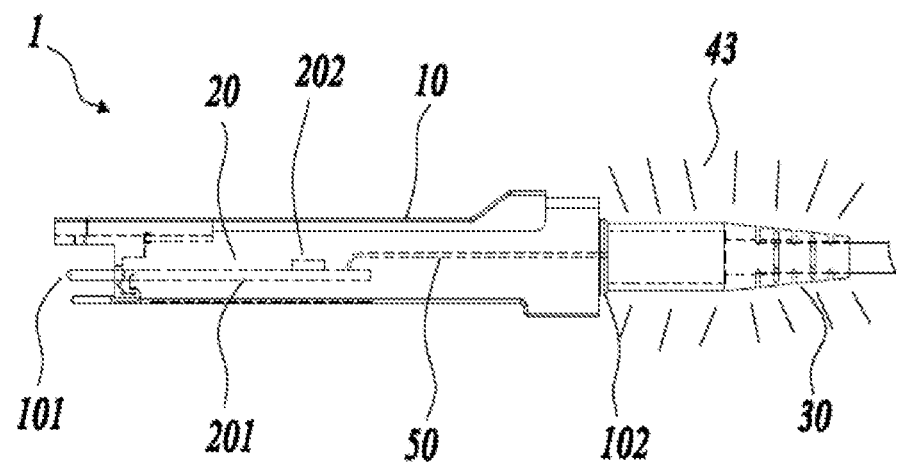
FIG. 4 is a sectional view of an optical communication module according to a third embodiment of the present disclosure.

FIG. 4 illustrates the optical communication module 1 according to a third embodiment. According to the third embodiment, the status indicator unit 40 is a fully illuminating protective layer 43 on the fiber-optic communication cable 30. The use of a fully illuminating protective layer 43 can allow the light emitted by the status indicator unit to cover a larger area.

Another embodiment of the present application further provides an optical communication module 1 including the status indicator unit 40 as described in any of the examples provided above, and the status indicator unit 40 is a status indicator light capable of displaying at least two colors, which can help operation and maintenance personnel to quickly identify at least two types of incidents arising in the optical communication module and take timely action.

The optical communication module in the present disclosure indicates the status of the optical communication module 1 by means of the status indicator unit 40 arranged on the fiber-optic communication cable 30. When the optical communication module 1 needs to be replaced or inspected, the control unit 202 can control the status indicator unit 40 to provide status indication, allowing operation and maintenance personnel to quickly and visually identify optical communication modules in need of replacement or inspection so that they may take timely action.

It should be understood that despite the descriptions of embodiments in the disclosure, each embodiment does not entail only one single independent technical solution. The disclosure is written this way simply for the sake of clarity. Those skilled in the art should consider the disclosure as a whole; the technical solutions associated with the embodiments may be combined in appropriate ways to form other embodiments that can be understood by those skilled in the art.

The series of detailed descriptions above is only intended to provide specific descriptions of feasible embodiments of the present invention. The detailed descriptions are not to be construed as limiting the scope of protection for the present invention; all equivalent embodiments or changes that relate to the techniques of the present invention in essence should fall under the scope of protection of the present invention.

What is claimed is:

1. An optical communication module, comprising:
   a casing with an optical signal port and an electrical signal port arranged respectively on two ends of the casing;
   a circuit board assembly and an optical component assembly arranged inside the casing, the circuit board assembly including a circuit board and a control unit arranged on the circuit board;
   a fiber-optic communication cable connected to the optical signal port; and a status indicator unit arranged on an exposed surface of the fiber-optic communication cable outside the optical signal port, where the control unit controls the status indicator unit to provide status indication.

2. The optical communication module according to claim 1, wherein the status indicator unit is electrically connected to the circuit board assembly by a lead wire.

3. The optical communication module according to claim 2, wherein the lead wire is secured to the fiber-optic communication cable.

4. The optical communication module according to claim 1, further comprising:
   an electrical contact point arranged on each one of the fiber-optic communication cable and the optical signal port,
   wherein the electrical contact point on the fiber-optic communication cable is electrically connected to the status indicator unit, and the electrical contact point on the optical signal port is electrically connected to the circuit board assembly, and
   when the fiber-optic communication cable is connected to the optical signal port, an electrical connection is established between the electrical contact point on the fiber-optic communication cable and the electrical contact point on the optical signal port.

5. The optical communication module according to claim 1, wherein the status indicator unit is a status indicator light.

6. The optical communication module according to claim 1, wherein the status indicator light is embedded within a protective layer of the fiber-optic communication cable.

7. The optical communication module according to claim 6, further comprising:
   a light transmitting strip arranged on an outer cover of the status indicator light,
   wherein the light transmitting strip encircles the fiber-optic communication cable.

8. The optical communication module according to claim 1, wherein the status indicator unit is a full-circle illuminating light or light strip, encircling an outer surface of the fiber-optic communication cable.

9. The optical communication module according to claim 1, wherein the status indicator unit is a fully illuminating protective layer on the fiber-optic communication cable.

10. The optical communication module according to claim 1, wherein the status indicator unit is a status indicator light capable of displaying at least two colors.

* * * * *